United States Patent
Shoemaker

[11] 3,804,214
[45] Apr. 16, 1974

[54] DUAL BRAKING SYSTEM FOR A MINING LOCOMOTIVE

[75] Inventor: Leon H. Shoemaker, Russell, Ky.

[73] Assignee: National Mine Service Company, Pittsburgh, Pa.

[22] Filed: Sept. 27, 1972

[21] Appl. No.: 292,516

Related U.S. Application Data

[63] Continuation-in-part of Ser. No. 193,655, Oct. 29, 1971.

[52] U.S. Cl. .................................. 188/107, 188/55
[51] Int. Cl. ............................................. B61h 13/20
[58] Field of Search ...... 188/52, 53, 55, 107, 153 R

[56] References Cited
UNITED STATES PATENTS

| 833,076 | 10/1906 | Marco | 188/107 |
| 723,297 | 3/1903 | Nightingale | 188/107 |

FOREIGN PATENTS OR APPLICATIONS

| 190,881 | 8/1937 | Switzerland | 188/107 |

*Primary Examiner*—Duane A. Reger
*Attorney, Agent, or Firm*—Stanley J. Price, Jr.

[57] ABSTRACT

The braking system includes mechanically actuated apparatus to move the brake shoes into frictional engagement with the locomotive wheels. The mechanically actuated apparatus has a hand wheel suitably mounted in the operator's compartment. The hand wheel is connected to one end of a rotatable screw device. The other end of the rotatable screw device is threadedly secured in a threaded bore of a bracket member. The bracket member is secured to a transversely extending equalizer bar. The equalizer bar is connected by a pair of link members to vertically extending brake levers through a lost motion connection. The vertically extending brake levers are pivotally secured to wheel brake assemblies that include a pair of depending hanger levers to which brake shoes are pivotally connected. The brake assembly includes a wear adjustment device to adjust the position of the brake shoes due to wear. Rotation of the hand wheel moves the bracket and equalizer bar longitudinally and through the link members pivots the vertically extending brake levers. The brake levers, in turn, move the brake shoes into frictional engagement with the wheels of the locomotive and apply a braking force thereto. The fluid actuated auxiliary braking apparatus includes a manually operated hydraulic pump in the operator's compartment connected to a source of hydraulic fluid. The actuating shaft of the pump has a hand wheel connected thereto. One or more piston cylinder servomechanisms are mounted on the locomotive adjacent the equalizer bar with the piston rod connected thereto through suitable overtravel linkages. A check valve assembly is provided to maintain the fluid pressure supplied by the hydraulic fluid pump to the piston cylinder servomechanisms for control of the brake system. The ports of the hydraulic pump are connected by conduits to the inlet ports of the housing of the check valve assembly. The outlet ports of the check valve assembly are connected in turn by conduits to the cylinder on opposite sides of the piston within the cylinder. Rotation of the hand wheel connected to the hydraulic pump in one direction supplies fluid to the piston cylinder assembly to extend the piston rod and move the equalizer bar. The check valve assembly maintains the fluid pressure exerted upon the piston within the cylinder to extend the piston rod. The movement of the equalizer bar moves the brake shoes into frictional engagement with the locomotive wheels through the same linkages associated with the mechanically actuated apparatus. The brake shoes will remain in frictional engagement with the locomotive wheels once the hand brake wheel has been released by operation of the check valve assembly. The rotation of the hand wheel connected to the pump in the opposite direction moves the brake shoes out of frictional engagement with the locomotive wheels. Rotation of the hand wheel in the opposite direction will operate the check valve assembly to release the fluid pressure applied to the piston with the cylinder to retract the piston rod and move the equalizer bar. The amount of frictional force exerted by the brake shoes when actuated by the fluid actuated auxiliary braking system is accurately and positively controlled by operation of the check valve assembly in maintaining fluid pressure supplied by the hydraulic fluid pump.

11 Claims, 3 Drawing Figures

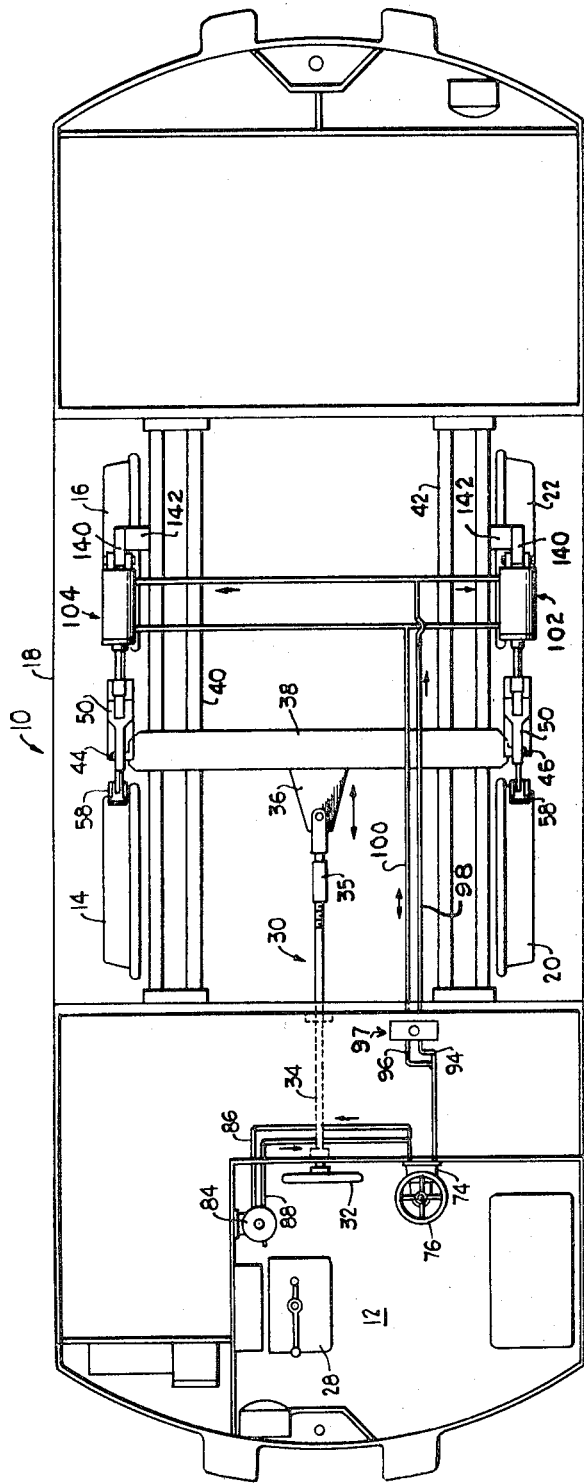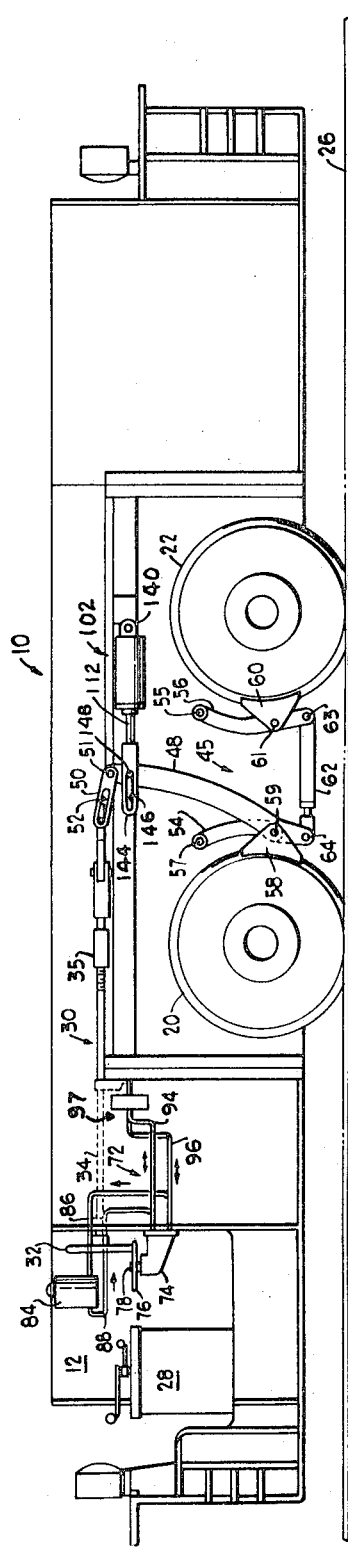

DUAL BRAKING SYSTEM FOR A MINING LOCOMOTIVE

CROSS REFERENCES TO RELATED APPLICATIONS

This application is a continuation-in-part of pending United States Application, Ser. No. 193,655, entitled "Dual Braking System for a Mining Locomotive", which was filed in the United States Patent Office on Oct. 29, 1971.

BACKGROUND OF THE INVENTION

1. Field of the Invention

This invention relates to a manually operated fluid actuated braking apparatus and more particularly to a dual braking apparatus for a mine locomotive that includes a mechanical brake actuator and a fluid brake actuator.

2. Description of the Prior Art

Conventional mine locomotives have mechanically actuated braking systems in which a telescoping screw is attached to the hand wheel and to an equalizer bar. Rotation of the hand wheel moves the equalizer bar which, in turn, through mechanical linkages to the brake shoes moves the brake shoes outwardly against the wheels.

Fluid actuated locomotive type brakes are also known, as illustrated in U.S. Pat. Nos. 2,274,021, 2,406,440, 2,657,771, 2,762,459 and 2,970,674. Fluid actuated braking systems alone have inherent disadvantages as, for example, loss of fluid pressure by conduit failure and the like during the braking operation and also loss of fluid pressure while the brakes are engaged and the locomotive is parked. U.S. Pat. No. 2,657,771 provides a separate mechanically actuated parking brake on the locomotive. A separate complex lever system is associated with the mechanical parking brake and both brake systems are independent of each other.

A mechanically actuated braking system has a substantial number of disadvantages as the sole braking system for the locomotive. Because of the mechanical linkages, accurate braking control is difficult and substantial effort is required to exert braking force to the brake shoes especially at high speeds. There is a need for a braking system that has the advantageous features of a mechanical braking system and is operable to apply the locomotive brakes through the same linkage system with a minimum effort by the operator. Further, there is a need for a locomotive braking system that provides accurate control of the braking force at different locomotive speeds. Additionally, there is a need for a locomotive braking system that provides an accurate control of the braking force after the operator releases the hand wheel.

SUMMARY OF THE INVENTION

In accordance with the present invention there is provided a dual braking system for a mine locomotive that includes an equalizer bar extending transversely across the body of a mine locomotive. The equalizer bar has end portions that terminate adjacent to wheels mounted on the sides of the mine locomotive body. Brake shoe assemblies that include brake shoes are positioned adjacent to the wheels. A pair of brake levers are pivotally connected to the brake shoe assemblies and are arranged to pivot in one direction and move the brake shoes into frictional engagement with the wheels. There are also provided links connecting the pair of brake levers to the equalizer bar end portion. A mechanical brake actuating means is operable to mechanically move the equalizer bar and, through the links, pivot the brake levers. A fluid actuated brake actuating means that includes valve control means is connected to the hydraulic fluid source and the piston cylinder means and is operable to control the fluid pressure supplied by the hydraulic fluid source to the piston cylinder means. The piston cylinder means is connected to the brake assemblies and is operable upon actuation to move the brake shoes into frictional engagement with the wheels. Overtravel means are provided for both the mechanical brake actuating means and the fluid actuated brake actuating means. The overtravel means permit either the mechanical brake actuating means or the fluid actuated brake actuating means to frictionally engage the brake shoes to the wheels.

The fluid actuated brake actuating means is an auxiliary braking apparatus that may be connected to existing mine locomotives having a mechanical brake actuating means. The auxiliary braking apparatus includes a closed loop hydraulic circuit that has a manually operable fluid pump, a fluid reservoir, valve control means, piston cylinder means, and first conduit means connecting the fluid reservoir to the manually operable fluid pump, connecting the manually operable fluid pump to the valve control means, and connecting the valve control means by second conduit means to the piston cylinder means. The manually operable fluid pump is arranged upon actuation to supply fluid to the piston cylinder means to extend or retract the piston cylinder means. Further pressure is applied from the manually operable fluid pump to the first conduit means to the valve control means. The valve control means maintains constant fluid pressure as applied by the manually operable fluid pump and supplies the fluid through a second conduit means to the piston cylinder means. The piston cylinder means is arranged to be connected to a portion of the existing mechanical brake actuating means so that upon actuation of the manually operable pump the piston cylinder means actuates the brakes connected to the mechanical actuating means.

With this arrangement it is now possible to provide dual brakes for a mine locomotive without major modifications to the existing mechanical braking apparatus. The fluid actuated brake actuating means is arranged to operate the same brake shoes as the mechanical brake actuating means. There are provided, however, two separate systems, either of which is capable of applying the brakes regardless of the position of the other. It is preferred that the fluid actuated brake actuating means be normally employed as the service brake during the operation of the mine locomotive and the mechanical brake actuating means be employed for parking and emergency use; however, operation of the valve control means to maintain constant fluid pressure for fully extending the piston cylinder means permits use of the fluid actuated brake actuating means as a park brake when the manually operable fluid pump has been released by the operator.

Accordingly, the principal object of this invention is to provide auxiliary braking apparatus that may be connected to an existing mine locomotive having mechanical brake actuating means.

Another object of this invention is to provide an auxiliary fluid actuated brake actuating means that operates the same brake shoes as the mechanical brake actuating means.

Still another object of this invention is to provide an auxiliary fluid actuated brake actuating means that includes a control valve means for maintaining in the piston cylinder means the fluid pressure applied by the manually operable fluid pump to the piston cylinder means when the manually operable pump is released.

A further object of this invention is to provide an auxiliary fluid actuated brake actuating means having a valve control means operable to partially release fluid pressure supplied to the piston cylinder means and to maintain constant a reduced pressure in the piston cylinder means.

These and other objects and advantages of this invention will be more completely disclosed and described in the following specification, the accompanying drawings and the appended claims.

BRIEF DESCRIPTION OF THE DRAWINGS

FIG. 1 is a top plan view of a mine locomotive illustrating the dual braking system wherein a pair of actuating cylinders are connected to the brake arms on opposite sides of the locomotive.

FIG. 2 is a view is side elevation of the locomotive with the dual braking system thereon illustrated in FIG. 1.

DESCRIPTION OF THE PREFERRED EMBODIMENTS

Figure 3:
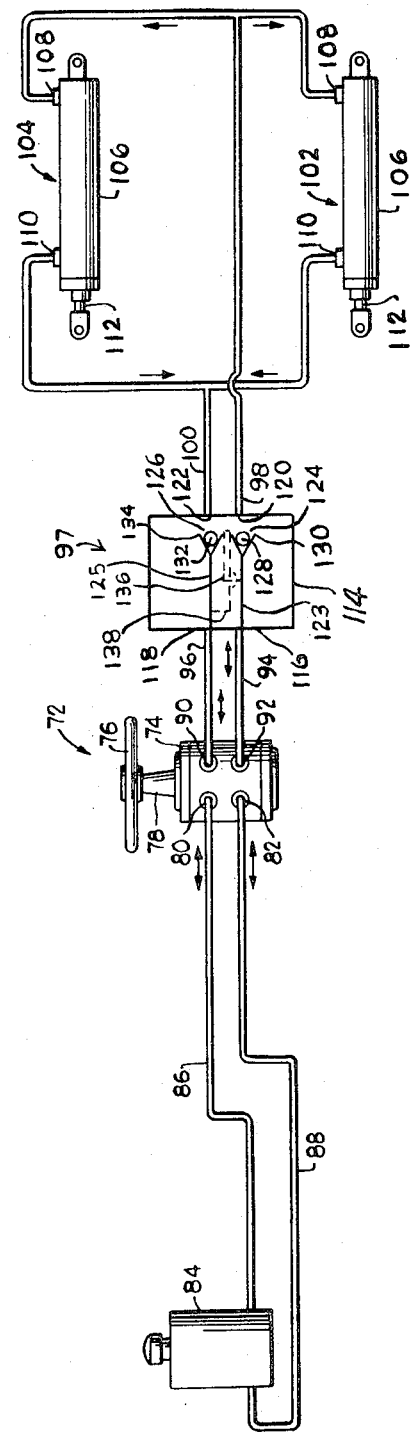
FIG. 3 is a schematic illustration of the closed loop hydraulic circuit provided with a check valve assembly for the manually operated fluid actuated brake.

Referring to FIGS. 1 and 2 there is illustrated schematically a rail mounted mine locomotive generally designated by the numeral 10 that has an operator's compartment 12 and wheels 14 and 16 mounted adjacent one side 18 of the mine locomotive 10 and other wheels 20 and 22 mounted adjacent the other side 24 of locomotive 10. The wheels in the embodiment illustrated are recessed within the body of the locomotive 10 and are suitably connected to drive or propelling means (not shown). It should be understood, however, that the hereinafter described dual braking system is operable to be connected to mine locomotives with wheel arrangements other than those illustrated in the drawings and the relative position of the wheels and the number of wheels to which the brakes are applied is not critical to the hereinafter described braking apparatus. Wheels 14, 16, 20, and 22 are mounted on a pair of rails 26, one of which is illustrated in FIG. 2. The locomotive is preferably electrically propelled and has a power control device 28 in the operator's compartment 12.

A mechanical braking apparatus for the locomotive 10 is generally designated by the numeral 30 and includes a hand wheel 32 suitably mounted in the operator's compartment 12. A rod 34 has one end connected to the wheel 32 and is rotatable thereby. A transverse equalizer bar 38 has a bracket member 36 extending therefrom toward the rotatable hand wheel 32 and has an internally threaded bore or nut 35 in which the threaded end 37 of rod 34 is positioned. Rotation of hand wheel 32 and rod 34 moves the bracket 36 and equalizer bar longitudinally on the mine locomotive 10.

The equalizer bar 38 is suitably supported on a pair of longitudinally extending rail supports 40 and 42 for sliding movement thereon controlled by rotation of the hand wheel 32 and rod 34. The transverse equalizer bar has connector end portions 44 and 46 of reduced dimension that serve as connecting pins for the hereinafter described mechanical linkages to the brake shoes. The brake shoe assemblies generally designated by the numeral 45 include a pair of vertically extending brake levers 48 that are pivotally connected at their upper ends to links 50 by means of pins 51. The links 50 have elongated slots 52 therein in which the end portions 44 and 46 of equalizer bar 38 are positioned.

The brake shoe assemblies 45 further include a pair of hanger levers 54 and 56 that are pivotally connected to the body of the locomotive by means of pins 55, 57. The lever 54 is pivotally connected at its lower end to a brake shoe 58 by pin 59. The hanger lever 56 is connected at an intermediate pivot connection to brake shoe 60 by a pin 61. The end of lever 56 is pivotally connected to a brake adjustment cylinder 62 by pin 63. The other end of brake adjustment cylinder 62 is pivotally connected by pin 64 to the lower end of brake lever 48. The brake lever 48 is also connected intermediate its end portions to the brake shoe 58. It will be apparent by the movement of brake levers 48 toward the operator's compartment 12 that the brake shoes 58 and 60 are urged toward the respective wheels 14, 16, and 20, 22, and into frictional engagement therewith. The mechanical brake actuating mechanism 30 above described operates in the following manner. To apply the brakes to wheels 14, 16 20, and 22 the hand wheel 32 is rotated in a preselected direction to rotate the rod 34 and threadedly move the threaded bore or nut 35 thereon to move the equalizer bar 38 toward the operator's compartment 12. The equalizer bar 38 moves in the slotted overtravel slot 52 of link 50 and engages the link 50 to thus move link 50 toward the operator's compartment 12. The link 50, in turn, through the pin connection 51, moves the brake levers 48, in turn, moves the brake shoe 58 into frictional engagement with the respective wheel 14 or 20 and through the brake adjusting cylinder 62 also urges the brake shoe 60 into frictional engagement with the respective wheels 16 or 22 to engage the brake of the locomotive 10. To mechanically release the brake the hand wheel 32 is rotated in the opposite direction to move the equalizer bar 38 away from the operator's compartment. The equalizer bar moves through the overtravel slot 52 in link 50 and thereafter moves the brake levers 48 in a clockwise direction as viewed in FIG. 2 to release the brake shoes 58 and 60. Suitable locking means may be provided to lock the brake in a fixed position as, for example when the vehicle is in a parked position.

The fluid actuated auxiliary braking apparatus is illustrated in FIGS. 1, 2 and 3 and is generally designated by the numeral 72. A hydraulic pump 74, preferably a manually operated pump that includes a metering valve within the pump housing, has a hand wheel 76 connected to the pump shaft 78. The pump is suitably mounted within the operator's compartment 12 with the hand wheel 76 adjacent to the operator within the compartment 12. A suitable hydraulic pump for use in the fluid actuated auxiliary braking apparatus is sold under the trade name "Orbitrol" by the Char-Lynn Company of Minneapolis, Minnesota. The hydraulic pump has inlet and outlet ports 80 and 82 (FIG. 3) connected to a tank or reservoir 84 positioned within the operator's compartment 12, preferably at an elevation above the pump 74. At this elevated location the hydraulic system is a self-bleeding system in that the air within the system will separate from the fluid in the tank 84. The pump 74 has a pair of cylinder ports 90 and 92 connected by means of conduits 94 and 96 to a check valve assembly generally designated by the numeral 97. A suitable check valve assembly for use in the fluid actuated auxiliary braking apparatus is sold by Gresen Manufacturing Company of Minneapolis, Minnesota and identified Manufacturers' No. LOA–25–D. The check valve assembly 97 is connected by conduits 98 and 100 to a pair of piston assemblies generally designated with the numerals 102 and 104. The piston cylinder assemblies 102 and 104 are similar in construction and have a cylinder 106 with ports 108 and 110 on opposite sides of a piston (not shown) within the cylinder 106. A piston rod 112 is connected to the piston within the cylinder 106 and is arranged to move reciprocally with the piston in the cylinder 106.

The check valve assembly 97 includes a valve housing 114 having inlet ports 116 and 118 connected to the conduits 94 and 96 respectively and outlet ports 120 and 122 connected to the conduits 98 and 100 respectively. The inlet port 116 and the outlet port 120 communicate with the valve chamber 124 through the valve passageway 123. Similarly, the inlet port 118 and the outlet port 122 communicate with the valve chamber 126 through the valve passageway 125. The valve member 128 enclosed in the valve chamber 124 co-acts with a valve seat 130 in the valve chamber 124 to seal in a fluid tight engagement the valve assembly 123 from the valve chamber 124. Also in a like manner, a valve member 132 enclosed in the valve chamber 126 co-acts with a valve seat 134 in the valve chamber 126 to seal in a fluid tight engagement the valve passageway 125 from the valve chamber 126. Also, a bypass passageway 136 is provided to communicate the valve passageway 123 with the valve chamber 126 and the bypass passageway 138 is provided to communicate the valve passageway 125 with the valve chamber 124.

The fluid actuated auxiliary braking apparatus 72 operates in the following manner. Rotation of the hand wheel 76 in a first direction actuates the pump 74 to displace fluid therethrough and supply fluid through port 92 to conduit 94 which connects with the inlet the port 116 positioned within the valve housing 114 of the check valve assembly 97. The fluid in conduit 94 is directed through the inlet port 116 to the valve passageway 123. The connection of the conduit 94 with the valve passageway 123 by the inlet port 116 maintains the same fluid pressure in the conduit 94 as in the valve passageway 123. The fluid flowing in the passgeway 123 enters the valve chamber 124 imparting an outwardly exerting force to the valve member 128 displacing the valve member 128 from its fluid tight engagement with the valve seat 130 to open the valve passageway 123 between the inlet port 116 and the outlet port 120. Once the pre-determined volume of fluid has entered the valve chamber 124 and has passed into the conduit 98 through the outlet port 120, an inwardly exerted fluid force in the valve chamber 124 and the conduit 98 engages the valve member 128 in a fluid tight seal with the valve seat 130. In this manner, the valve member 128 closes the valve passageway 123 and valve chamber 124 between the inlet port 116 and the outlet port 120 at the pressure determined by the selected rotation of the hand wheel (as shown in FIG. 3).

The fluid supplied through conduit 98 and the rear ports 108 of both of the cylinders 106 displaces the pistons within the cylinders 106 to move the piston rods 112 outwardly from the cylinders 106. When rotation of the hand wheel 76 is stopped, the valve member 128 operates to close the valve passageway 123 by sealing the valve chamber 124. Fluid is directed from the valve passageway 123 to the bypass passageway 136 communicating with the valve member 126. The fluid delivered from the bypass passageway 136 applies an upwardly exerting force upon valve member 132 in a fluid tight engagement with the valve seat 134 in valve chamber 126. The fluid tight seal formed by the engaging valve member 132 with valve seat 134 closes the valve passageway 125 and valve chamber 126 between the inlet port 118 and the outlet port 122 (as shown in FIG. 3). Sealing of valve chamber 126 by the flow of fluid through the bypass passageway 136 prevents loss of fluid pressure created by the escape of fluid from the piston 104 through valve chamber 126 communicating with piston 104 and connected thereto by ports 110, conduit 100, and outlet port 122 in the valve housing 114. With valve chamber 126 effectively sealed by the flow of fluid through bypass passageway 136 constant fluid pressure supplied by the pump 74 to the cylinders 106 maintains the piston rods 112 in an extended position.

To retract the piston rods 112 hand wheel 76 is rotated in the opposite direction to supply fluid through conduit 96. Maintaining constant pressure, the fluid passes from conduit 96 to valve passageway 125 through inlet port 118 positioned in the valve housing 114 of the check valve assembly 97. Within valve passageway 125 the fluid imparts an outwardly exerting force against the valve member 132 to release the valve member 132 from its sealing engagement with the valve seat 134. The fluid is then freely directed through the valve chamber 126. When rotation of the hand wheel 76 is stopped, the outwardly exerting fluid pressure against the valve member 132 is relieved. The valve member 132 once again returns to its fluid tight engagement with valve seat 134 when subjected to fluid pressure applied inwardly within the valve chamber 124 (as shown in FIG. 3). The fluid passing through the valve chamber 124 exits the housing 114 through outlet port 122 connected to conduit 100.

The fluid within conduit 100 enters the ports 110 of cylinders 106 and moves the pistons therein rearwardly in the cylinders 106 to retract the piston rods 112. The fluid in the cylinders 106 displaced by the pistons therein flows out ports 108 through conduit 98, through the valve passageway 123 within housing 114, and through the pump 74 to the reservoir 84. Once the desired volume of fluid has been displaced by the pistons in the cylinders 106 fluid passing through the passageway 125 enters the bypass passageway 138 and is thereby supplied to the valve chamber 124. The fluid delivered to valve chamber 124 imparts an upwardly exerting force upon valve member 128 in a fluid tight seal with the valve seat 130. The fluid tight seal between valve member 128 and valve seat 130 terminates reverse flow from conduit 98 through the check valve assembly 97 to conduit 92.

Now referring to FIGS. 1 and 2, the piston cylinder assemblies 102 and 104 are pivotally connected to brackets 111 by clevis type connections 110. The piston rods 112 have a forwardly extending arm portion 114 connected thereto. The arm portion 144 has an elongated overtravel slot 146 therein. A pin member 148 on brake levers 48 extends into the slot 146 of arm 144. To engage the brake shoes 58 and 60 to the respective wheels 14, 20, 16 and 22 by the hydraulically actuated braking apparatus 72, the hand wheel 76 is rotated in a preselected direction to supply fluid from conduit 94 through the check valve assembly 97 to the ports 108 of cylinders 106. The piston rods 112 are moved outwardly from the respective cylinders 106 and the arms 144 move forwardly toward the operator's compartment 12 until the pin 148 moves in slot 146 and is engaged by arms 146. Further movement of the piston rod 112 pivots the brake levers 48 in a counterclockwise direction as viewed in FIG. 2 to engage the brake shoes 58 and 60 to the respective mine locomotive wheels. Continued rotation of the hand wheel 76 by means of fluid under pressure in conduit 94 further urges the brake shoes 58 and 60 into further frictional engagement with the respective mine locomotive wheels. To maintain a preselected braking force by the brake shoes, check valve assembly 97 operates to maintain the constant fluid pressure supplied to the cylinders 106 by the pump 74. To release the brake shoes 58 and 60 the hand wheel 76 is rotated in the opposite direction to supply fluid from conduit 96 through the check valve assembly 97 to the ports 110 of cylinders 106. Rotating the hand wheel in the opposite direction operates the check valve assembly 97 to relieve the constant fluid pressure supplied to the cylinders 106 by the pump 74. It is to be noted that the check valve assembly 97 is operable as described herein above to maintain a partial braking force exerted by the brake shoes 58 and 60 when the hand wheel is partially rotated in the reverse direction. Furthermore, with this arrangement the brake shoes 58 and 60 will remain partially as well as fully engaged to the wheels 20 and 22 for retarding down grade speed or functioning as a parking brake with this arrangement after the operator releases the brakes.

It should be noted that the brake assemblies 45 may be applied by either the mechanical braking apparatus 30 or the fluid actuated braking apparatus 72. The mechanical braking apparatus 30 is provided with overtravel means, i.e. slots 52 in links 50 to permit actuation of the brake assemblies 45 by the fluid actuated braking apparatus 72. The fluid actuated braking apparatus is also provided with an overtravel means, i.e. slot 146 in arm 144, to permit the brake assemblies 45 to be actuated by the mechanical braking apparatus 30. There are provided two independent braking systems for the mine locomotive 10, i.e. the mechanical braking apparatus 30 and the fluid actuated braking apparatus 72. Both of the braking apparatus operate the same brake shoes in the brake assemblies 45. Thus, the fluid actuated braking apparatus 72 operates the same brake assemblies 45 as the mechanically actuated braking apparatus 30. It is preferred that the fluid actuated braking apparatus 72 be normally used as a service brake during the operation of the mine locomotive because of its ease in operation and the mechanically actuated braking apparatus 30 be used for parking the locomotive 10 for land emergency use. However, operation of the check valve assembly permits use of the fluid actuated braking apparatus 72 for use as both a service brake and a parking brake. The overtravel means, that is the slotted links 50 and slotted arm 144 permit each system, i.e. the mechanical braking system 30 and fluid actuated braking system 72, to have an unobstructed travel through the full range.

While the check valve assembly has been described in connection with only a single embodiment of a fluid actuated braking system 72, one skilled in the art will appreciate that the check valve assembly 97 is not so limited. The check valve assembly 97 is operably adaptable to control the fluid pressure supplied by a fluid pump to any number of piston cylinder assemblies for connection to brake assemblies. Accordingly, the check valve assembly for use in the fluid actuated brake system described herein above can also be used with the other embodiments of the fluid actuated brake systems described in my copending application.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A dual braking system for mine locomotives comprising, an equalizer bar extending transversely across the body of a mine locomotive, said equalizer bar having end portions terminating adjacent to wheels mounted on the sides of said mine locomotive body, brake shoe assemblies including brake shoes positioned adjacent to said wheels, a pair of brake levers pivotally connected to said brake shoe assemblies, said pair of brake levers operable to pivot in one direction and move said brake shoes into frictional engagement with said wheels, links connecting said pair of brake levers to said equalizer bar end portions, mechanical brake actuating means operable to mechanically move said equalizer bar through said links to pivot said pair of brake levers, piston cylinder means connected to said brake shoe assemblies and operable upon actuation to move said brake shoes into frictional engagement with said wheels, a manually actuated fluid pump, a fluid reservoir, a valve means operable to actuate said piston cylinder so that said brake shoes move into frictional engagement with said wheels, first conduit means connecting said fluid reservoir to said manually actuated fluid pump, second conduit means connecting said manually actuated fluid pump to said valve assembly, third conduit means connecting said valve assembly to said piston cylinder assembly so that upon manual actuation of said manually actuated fluid pump fluid is supplied through said second conduit means to said valve means operable to supply fluid through said third conduit means to said piston cylinder means, and overtravel means for said mechanical brake actuating means and said fluid actuating means, said overtravel means operable to permit either said mechanical brake actuating means or said fluid actuated brake actuating means to frictionally engage said brake shoes to said wheels.

2. A dual braking system as set forth in claim 1 in which said valve means includes, said valve assembly connected at one end to said second conduit means so that fluid under pressure is supplied by said manually actuated fluid pump to said valve assembly and, said valve assembly operably connected at the other end to said third conduit means so that fluid being supplied from said manually actuated fluid pump through said third conduit means to said piston cylinder assemblies is maintained within said piston cylinder assemblies at the preselected pressure level as applied by said manually actuated fluid pump.

3. A dual braking system as set forth in claim 1 in which said valve means for said fluid actuated brake actuating means includes, pairs of communicating ports extending through said valve assembly, first said pair of communicating ports is connected to said manually actuated fluid pump by said second conduit means so that the pressure of the fluid in said valve assembly is equal to the pressure of the fluid as applied by the manually actuated fluid pump flowing through said second conduit means, second said pair of communicating ports is connected to said piston cylinder assemblies by said third conduit means so that the pressure of the fluid in said third conduit means is equal to the pressure of the fluid passing through said valve assembly, and said valve means operable upon actuation of said manually actuated fluid pump to maintain a preselected fluid pressure level being supplied to said piston cylinder assemblies to thereby extend or retract said piston cylinder means to control the frictional engagement of said brake shoes with said wheels.

4. A dual braking system as set forth in claim 1 which includes, means connecting said piston cylinder means to said equalizer bar.

5. A dual braking system for mine locomotives as set forth in claim 1 in which said piston cylinder means includes, a pair of piston cylinder assemblies connected at one end to said locomotive body and at the other end to said respective brake levers.

6. A dual braking system for mine locomotives as set forth in claim 1 in which said piston cylinder means includes, a piston cylinder assembly connected at one end to said locomotive body and at the other end to said equalizer bar along the longitudinal axis of said locomotive body.

7. A dual braking system for mine locomotives as set forth in claim 1 which includes, a second pair of brake levers pivotally connected to said brake shoe assemblies, said second pair of brake levers operable to pivot in one direction and move said brake shoes into frictional engagement with said wheels, said piston cylinder means including a pair of piston cylinder assemblies connected at one end to said locomotive body and at the other end to said respective second brake levers.

8. A dual braking system for mine locomotives as set forth in claim 1 in which said overtravel means for said mechanical actuating means includes, an elongated slot in each of said links and pin means on said equalizer bar end portions extending into said respective slots in said links, said equalizer bar pin means arranged to move in said elongated slots upon actuation of said fluid brake actuating means to move said brake shoes into frictional engagement with said wheels.

9. A dual braking system for mine locomotives as set forth in claim 3 in which said overtravel means for said fluid actuated brake actuating means includes, an arm member connected to one end of said piston cylinder assembly, said arm member having an elogated slot therein, pin means on said pair of brake levers, said pin means positioned in said respective elongated slots and arranged to move in said elongated slots upon actuation of said mechanical brake actuating means to move said brake shoes into frictional engagement with said wheels.

10. A dual braking system for mine locomotives as set forth in claim 1 in which said overtravel means for said fluid actuated brake actuating means includes, a piston cylinder assembly, a piston rod telescopically positioned in a hollow rod, said piston rod connected to said equalizer bar and operable upon movement of said equalizer bar by said mechanical brake actuating means to move longitudinally relative to said hollow rod.

11. Auxiliary braking apparatus for a mine locomotive comprising, a manually operable fluid pump, a fluid reservoir, valve means, piston cylinder means, first conduit means connecting said fluid reservoir to said manually operable pump, second conduit means connecting said manually operable pump to said valve means, third conduit means connecting said valve means to said piston cylinder means, said manually operable fluid pump operable upon actuation to supply fluid through said second and third conduit means to extend or retract said piston cylinder means, said valve means operable upon actuation of said manually operable fluid pump to maintain a preselected fluid pressure level being supplied to extend or retract said piston cylinder means, and said piston cylinder means operable to be connected to a portion of a mechanical brake actuating means so that upon actuation of said manually operable fluid pump said piston cylinder means actuates the brakes connected to said mechanical actuating means.

* * * * *

UNITED STATES PATENT OFFICE
CERTIFICATE OF CORRECTION

Patent No. 3,804,214    Dated April 16, 1974

Inventor(s) Leon H. Sheomaker

It is certified that error appears in the above-identified patent and that said Letters Patent are hereby corrected as shown below:

Column 5, line 37, after "valve" delete "assembly" and insert -- passageway --. Column 6, line 15, after "valve" delete "member" and insert -- chamber --. Column 7, line 5, after "brackets" delete "111" and insert -- 112 --; line 19, after "arms" delete "146" and insert -- 144 --.

Signed and sealed this 7th day of January 1975.

(SEAL)
Attest:

McCOY M. GIBSON JR.
Attesting Officer

C. MARSHALL DANN
Commissioner of Patents